United States Patent [19]

Kitahama et al.

[11] Patent Number: 4,931,118

[45] Date of Patent: Jun. 5, 1990

[54] METHOD OF MANUFACTURING MULTIRIBBED BELTS

[75] Inventors: Koji Kitahama; Kyoichi Mishima; Toshimi Kumasaki, all of Hyogo, Japan

[73] Assignee: Mitsuboshi Belting Ltd., Kobe, Japan

[21] Appl. No.: 299,261

[22] Filed: Jan. 23, 1989

[30] Foreign Application Priority Data

Jan. 23, 1988 [JP] Japan .................................. 63-13321

[51] Int. Cl.⁵ .............................................. B29H 7/22
[52] U.S. Cl. ..................................... 156/138; 156/139; 156/140; 156/142; 156/245; 156/268; 474/263
[58] Field of Search ............... 156/138, 140, 142, 139, 156/154, 268; 264/162, 326, 347, 297.5; 425/28.1, 34.2, 818; 474/238, 249, 250, 251, 252, 263

[56] References Cited

U.S. PATENT DOCUMENTS

| | | | |
|---|---|---|---|
| 3,839,116 | 10/1974 | Thomas et al. ...................... | 156/138 |
| 4,106,966 | 8/1978 | Brooks ................................. | 156/138 |
| 4,177,688 | 12/1979 | Howerton et al. ............. | 156/142 X |
| 4,231,826 | 11/1980 | Wrast et al. .......................... | 156/138 |

FOREIGN PATENT DOCUMENTS

| | | | |
|---|---|---|---|
| 47-28704 | 7/1972 | Japan .................................. | 264/162 |
| 3005932 | 1/1988 | Japan .................................. | 264/162 |

Primary Examiner—David Simmons
Attorney, Agent, or Firm—Wood, Phillips, Mason, Recktenwald & VanSanten

[57] ABSTRACT

A multiribbed power transmission belt and method of manufacturing the same, wherein an unvulcanized belt preform is provided with transversely extending staple fibers in the compression section thereof. The compression section is caused to be vulcanized while being urged against a mold having projections forming shallow grooves in the inner surface thereof. The grooves have a depth in the range of approximately 20% to 50% of the height of the ribs intended to be formed in the final power transmission belt. The ribs are formed in the belt by removing material from the compression section of the vulcanized preform, such as by the conventional machining operations of grinding, cutting, etc. The angular deflection of the reinforcing fibers in the compression section is caused to be no more than approximately 25% to provide the improved belt construction.

9 Claims, 2 Drawing Sheets and 4,931,118

METHOD OF MANUFACTURING MULTIRIBBED BELTS

TECHNICAL FIELD

This invention relate to multiribbed power transmission belts and, in particular, to an improved multiribbed belt structure and method of manufacturing the same.

BACKGROUND ART

One conventional method of forming multiribbed belts is to form a belt sleeve having an inner compression rubber section. Upon completion of the vulcanization of the sleeve, grooves are cut into the compression section to define the longitudinally extending parallel ribs of the multiribbed belt.

It is common to provide, in the compression rubber, transversely extending staple fibers for providing improved transverse strength and rigidity, while yet permitting facilitated flexing of the belt about the pulleys, etc., of the drive system. When such grooves are cut into the compression section, a substantial amount of rubber and fibers are removed As a result, the forming of such multiribbed belts in this manner is relatively expensive.

Another method of forming such multiribbed belts is to form the compression section on a cylindrical mandrel having radially outwardly projecting ribs about which the unvulcanized compression rubber is urged during the vulcanization process so as to define grooves in the compression rubber section, with the ribs lying on opposite sides of the grooves.

While this latter method of formation of multiribbed belts eliminates the rubber and staple fiber loss in the first above-described method of manufacture, a serious problem arises in the latter manufacture in that the staple fibers are urged away from their transversely extending orientation to a relatively high angle thereto In such an orientation, the fibers offer substantially reduced transverse strength characteristics to the belt and cause a stiffening of the belt outwardly relative to the compression section, resulting in an inferior belt construction.

DISCLOSURE OF INVENTION

The present invention comprehends an improved power transmission belt structure and method of manufacturing the same which eliminates the disadvantages of the prior art manufacture, as discussed above.

More specifically, the invention comprehends provision of a method of manufacturing a multiribbed power transmission belt, including the steps of forming a belt preform defining an unvulcanized rubber layer having transversely extending staple fibers distributed therein, causing the compression layer to be vulcanized while urging the compression layer against a mold having a suitable projection to form a shallow groove in the confronting surface of the compression layer, the groove having a depth in the range of approximately 20% to 50% of the ribs intended to be formed in the power transmission belt, and removing material from the compression layer at the groove to form the intended multiribbed power transmission belt.

In the illustrated embodiment, the projection has a height preselected to cause the transversely extending staple fibers in the compression section portion adjacent the projection to be deflected from the transverse direction no more than 30° and preferably no more than approximately 25°.

In the illustrated embodiment, the compression layer is urged inwardly against the mold, which is provided with a raised projection for forming the shallow groove.

The belt preform may further include tensile cords overlying the compression layer and an unvulcanized outer rubber layer overlying the tensile cords, the outer rubber layer being vulcanized concurrently with the vulcanizing of the compression rubber layer and forming a cushion layer embedding the tensile cords.

In the illustrated embodiment, the shallow groove widens toward the mold and has a maximum width less than the maximum width of the groove between the ribs resulting from the step of removing material from the compression layer.

The step of removing material from the compression layer, in the illustrated embodiment, comprises a step of mechanically working the compression layer and, illustratively, may comprise a step of polishing, a step of cutting, etc.

In the illustrated embodiment, the compression layer is formed by a plurality of superposed sheets, which may have a thickness of approximately 0.8 to 1.2 millimeters.

The sidewalls of the belt comprise machined surfaces.

As a result of the novel manufacture, the staple fibers in the compression section vary gradually in angularity to the transverse direction of the belt from the midportion of the V-rib to the sidewalls thereof.

The belt and manufacture thereof of the present invention are extremely simple and economical, while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 3:
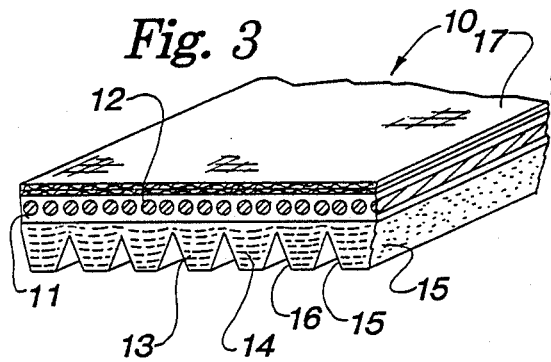
FIG. 3 is a fragmentary isometric view illustrating a section of a power transmission belt manufactured in accordance with the invention.

In the illustrative embodiment of the invention as disclosed in the drawing, a multiribbed power transmission belt generally designated 10 is shown in FIG. 3 to comprise a belt having a body 11 provided with a plurality of longitudinally extending tensile cords 12 spaced transversely of the belt.

The compression section of the belt is defined by a plurality of longitudinally extending, transversely spaced V-ribs 13. Short, staple-length reinforcing fibers 14 are distributed in the ribs and extend to the side edges 15 thereof.

Body 11 may be formed of cushion rubber. As seen in FIG. 3, grooves 16 between ribs 13 extend to adjacent the body portion 11.

Fabric layers 17 may be provided on the outer surface of the body 11.

Figure 7:
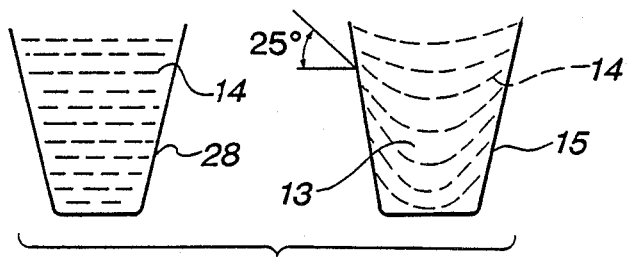
FIG. 7 is a fragmentary sectional view of a prior art belt manufactured by the prior art grinding method and a belt manufactured by the invention hereof.

The V-grooves 16 have a substantial height and are conventionally formed by machining away the compression section, as by grinding or cutting with knives The resultant rib construction is shown in FIG. 7 to define a rib 18 wherein the transverse reinforcing fibers 14 extend substantially transversely thereto. However, such manufacture is extremely wasteful and expensive in that a substantial portion of the vulcanized rubber material of the compression section must be removed and discarded after the vulcanization of the preform free of such grooves.

It is conventional in such belt manufacture to form the vulcanized preform in wrapped association about a cylindrical mandrel. Heat from the mandrel in an outer casing effects the desired vulcanization, whereupon the removal of the material to form the grooves between the V-ribs is effected.

In a modified form of prior art manufacture, the unvulcanized preform is urged against a mandrel provided with radially outwardly projecting ribs corresponding to the grooves 16 of the belt. The unvulcanized rubber permits the projections to become embedded in the compression section of the preform so that, upon vulcanization, the grooves are resultingly formed therein. However, such manufacture has the serious disadvantage of causing the reinforcing fiber orientation to be changed adjacent the edge surfaces of the ribs so as to extend at a substantial angle to the transverse direction, thereby substantially reducing the effective transverse reinforcement effect. In addition, the substantial angularity of the fibers adjacent the side edges of the ribs provides an undesirable stiffening of the ribs in the inner-outer direction. Such belt manufacture has the serious deficiency of reduced bending resistance and wear resistance. The choice between discarding as waste 40% to 60% of the rubber material of the compression section in forming the belts by the conventional machining of the ribs therein and the forming of the belt with reduced bending and wear resistance has presented a longstanding, vexatious problem in the belt manufacturing art.

The present invention comprehends a novel manufacture of such a multiribbed belt by use of a matrix mold 18 having a plurality of upstanding, relatively short triangular projections 19. The invention comprehends that the height of the projections 19 be in the range of approximately 20% to 50% of the height of the desired ribs 14.

Mold portion 18 is supported on a cylindrical drum 20 and may be formed of any suitable material, such as metal, i.e. iron, or elastic material, such as rubber, or synthetic resins, such as urethane resin.

The height of the ribs 14 is conventionally in the range of 2.0 to 2.9 millimeters.

The unvulcanized preform, generally designated 21, may be formed by wrapping around the matrix mold 18 a plurality of layers of unvulcanized sheet material 22 formed of suitable compression section material, such as natural rubber, SB rubber, chloroprene rubber, etc. Fibers 14 are distributed in the layers so as to extend substantially transversely of the preform. The sheet preferably has a thickness of 0.8 to 1.2 millimeters and is lap-wound by a calendar roll.

Tensile cords 12 may be formed of conventional low elongation, high strength material, such as polyester, nylon, aromatic polyamide, glass fibers, etc. An unvulcanized rubber layer 23 is then wound about the tensile cords and one or more canvas layers 17 wound about the rubber layer 23.

Figure 1:
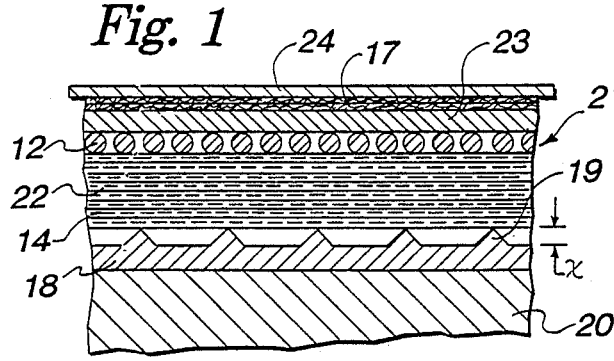
FIG. 1 is a fragmentary cross section of a preform disposed adjacent a matrix mold with projections thereon comprising one step in the novel method of forming the multiribbed power transmission belt of the invention.
Figure 2:
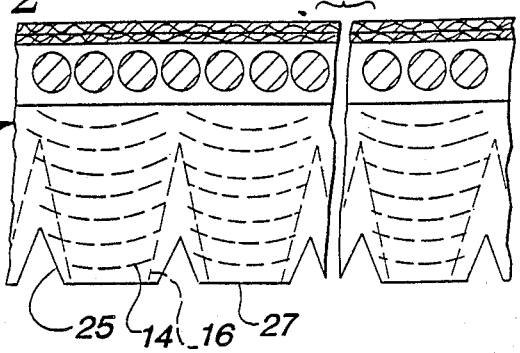
FIG. 2 is a fragmentary cross section illustrating a further step in the manufacture embodying the invention.

To effect the vulcanization of preform 21, an outer pressor 24 is disposed about the preform on the mold 18 and mandrel 20. The pressor may be conventionally formed as a rubber cylindrical jacket, or a thin, stainless steel band. This assembly is then heated under pressure, as by high pressure steam, in a vulcanizing chamber. As a result of the pressure and heat, the layers 22 of the preform are urged against the outer surface of the mold 18, with the projections 19 becoming embedded in the inner portion thereof to form relatively shallow V-shaped preform grooves 25, as seen in FIG. 2. At the same time, the rubber inwardly and outwardly of the tensile cords is caused to flow between the tensile cords so as to form a cushion rubber layer in which the tensile cords are effectively embedded in the final belt.

Upon completion of the vulcanization, the pressor 24 is removed and the vulcanized belt sleeve, generally designated 26 removed from the mold and inverted so as to provide the grooved surface 27 outermost. As shown in FIG. 2, the reinforcing fibers 14 in the compression section are deflected somewhat from the horizontal transverse direction by the action of the projections 19 during the vulcanization process, but only to a limited degree.

Grooves 15 are then formed in the surface 27 by a conventional machining process, such as by bringing a polishing wheel or the like against the surface 27 in alignment with each of the preform grooves 25 so as to remove sufficient material from the compression section to define the desired final grooves 16 of the belt. The machining process, as indicated above, may comprise a grinding process, cutting process, etc.

Thus, the invention comprehends the manufacture of the multiribbed belt with reduced loss of compression section material, while at the same time avoiding the problem of excess angularity of the transverse reinforcing fibers adjacent the side edges of the ribs, as has resulted in the prior art manufactures.

Figure 4:
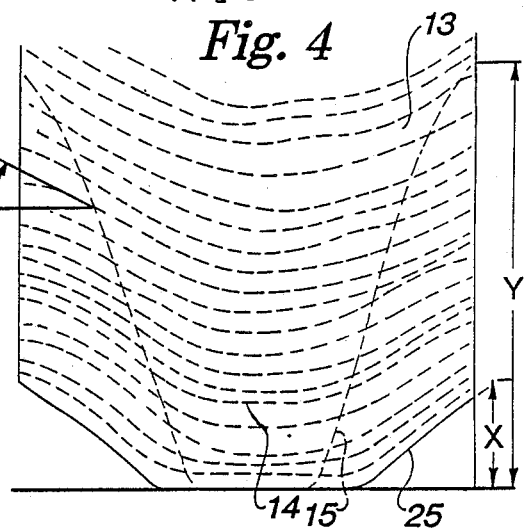
FIG. 4 is a fragmentary enlarged transverse section illustrating, in greater detail, the arrangement of the transverse fibers in the preform, as during the step illustrated in FIG. 2.

The manufacture of the respective ribs of the belt 10 is illustrated in greater detail in FIG. 4. As shown therein, the height X of the preform rib 25 is caused to be approximately 20% to 50% of the height Y of the rib 13 and, in the illustrated embodiment, is approximately 25% thereof. As shown in FIG. 4, the fibers 14 extend substantially horizontally transversely of the rib at the center thereof and have a maximum angularity relative to the transverse direction of no more than 30° and preferably no more than approximately 25° at the side edges 15 of the rib. Resultingly, the transverse stiffening effect of the fibers throughout the ribs is at least approximately 90% that of the fibers in the conventional machined rib 28, shown in FIG. 7. Similarly, the resistance of the belt to bending is approximately 42%.

By causing the ratio at the edges of the rib to be approximately 68%, the belt exhibits reduced bending resistance, thereby effectively extending the useful life of the belt against cracking and other deformations of the ribs.

It has been found that the range of 20% to 50% preform groove height relative to the height of the belt ribs 13 produces optimal characteristics in the belt. By maintaining the depth of the preform groove no more than 50% of the height of the belt rib, excellent bending resistance, wear resistance, and side pressure resistance are maintained, thus providing long, troublefree life of the belt. Reversely, when the depth of the groove is less than 20% of the height of the rib, excessive material must be removed from the compression section, extending the manufacturing time and cost.

Figure 5:
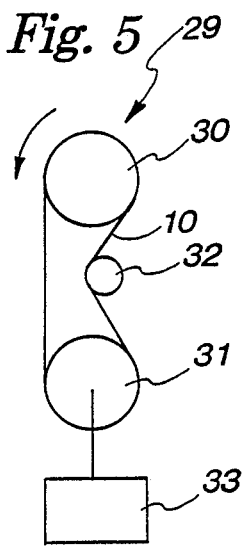
FIG. 5 is a schematic view of a testing machine for measuring the useful life of the belt formed by the invention.

A number of tests have been made on belts manufactured in accordance with the invention by means of a test apparatus generally designated 29, as shown in FIG. 5. As illustrated therein, a belt 10 manufactured in accordance with the invention, having a length of 980 millimeters, with three ribs, was engaged with a drive pulley 30 having a 120 millimeter diameter, a driven pulley 31 having a 120 millimeter diameter, and a tension pulley 32 having a 50 millimeter diameter providing a 150° reverse bending angle on the back of the belt. The drive pulley was rotated at 3600 rpm, with a 30 kilogram load 33 and with no load applied in the apparatus.

Figure 6:
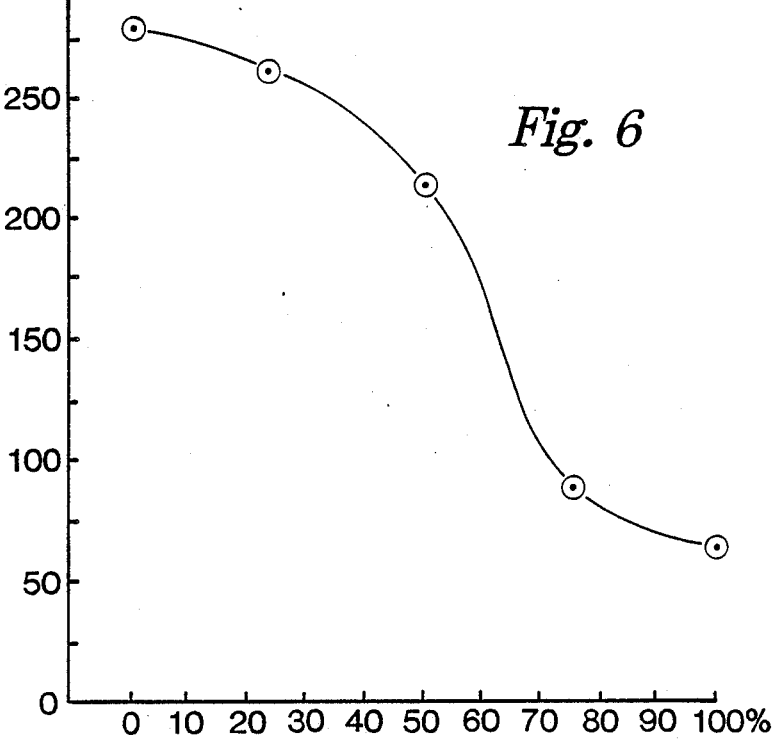
FIG. 6 is a graph showing the various test results of such belts having different heights of the formed grooves illustrated in FIG. 2.

As shown in FIG. 6, the useful running life of the belt is abruptly reduced where the height of the preform groove is greater than 50% of the height of the desired rib and only minimal change in the useful life is effected where the height of the preform groove is less than 20% of the rib.

Figure 8:
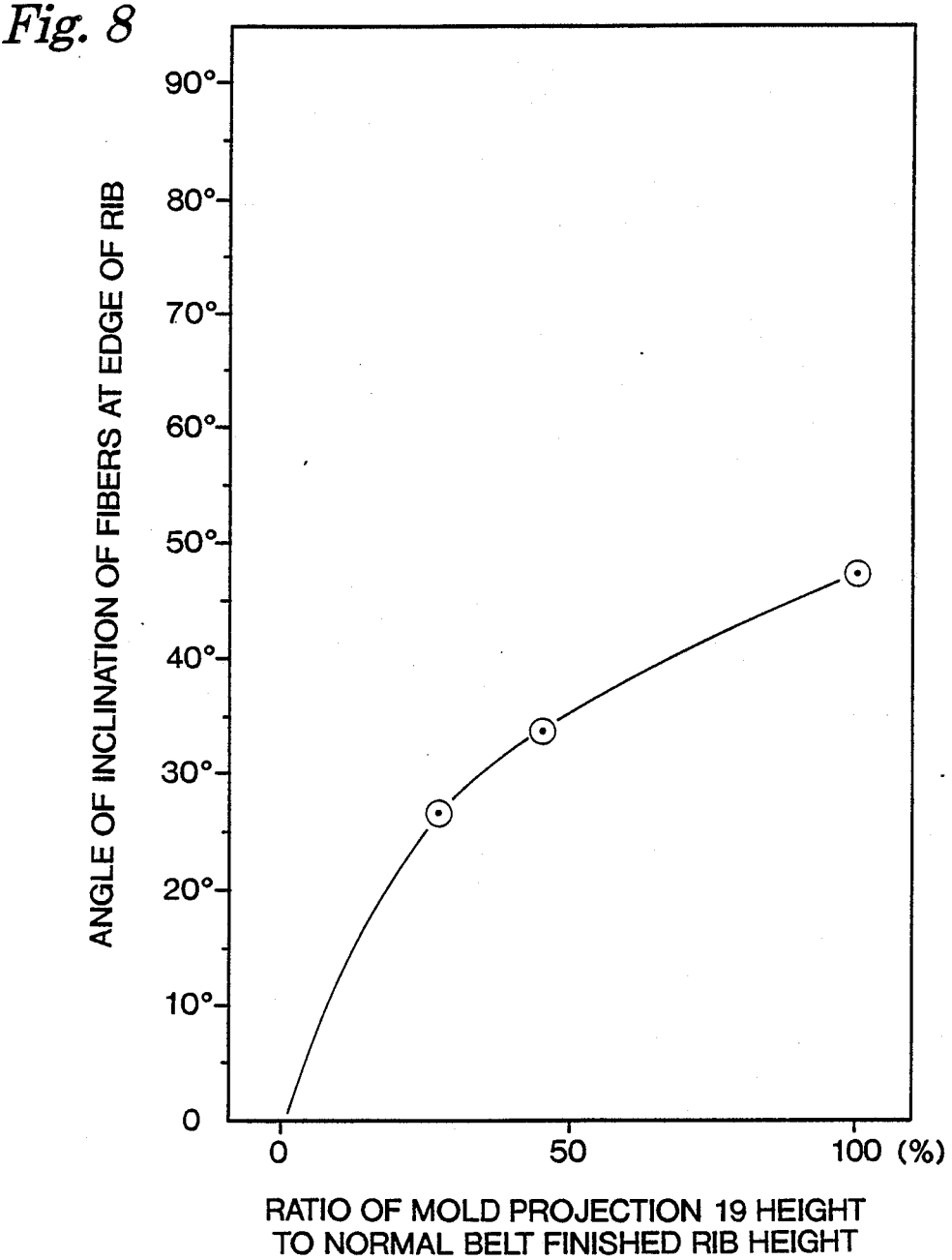
FIG. 8 is a graph illustrating the relationship of the inclining angle of the fibers at the edge of the belt to the ratio of the height of the projections on the matrix mold in FIG. 1 to the height of the ribs of the completed belt as shown in FIG. 3.

Referring to FIG. 8, the angularity of the reinforcing fibers adjacent the side edges 15 of the ribs varies directly as the ratio of the depth of the preform groove 25 to the height of the desired belt ribs. Thus, as shown, the angle of the fibers at the side edges of the ribs is maintained at less than 35° where the ratio of the preform groove to the belt rib height is 50% or less.

Thus, the invention comprehends an improved method of manufacturing a multiribbed power transmission belt wherein a belt preform of unvulcanized rubber is provided in the compression section thereof transversely extending staple fibers. The compression layer is caused to be vulcanized while being urged against a mold having a projection to form a shallow groove in the inner surface thereof, with the groove having a depth in the range of approximately 20% to 50% of the height of the ribs intended to be formed in the final power transmission belt made from the preform. The ribs are formed to their final configuration by removing material from the compression layer about the preform groove in the vulcanized preform. The invention comprehends selecting the parameters of the manufacture so as to assure that the staple fibers in the compression section adjacent the projection of the mold be deflected from the transverse direction no more than approximately 25%. The improved method of manufacture of the present invention has been found to produce a substantially improved power transmission belt having long, troublefree life.

The foregoing disclosure of specific embodiments is illustrative of the broad inventive concepts conmprehended by the invention.

We claim:

1. The method of manufacturing a multirib power transmission belt comprising the steps of:
   forming a belt preform defining an unvulcanized rubber compression layer having transversely extending staple fibers distributed therein;
   causing the compression layer to be vulcanized while urging the compression layer against a mold having a suitable projection to form an inwardly widening groove in the confronting surface of the compression layer, the rubber of the compression layer adjacent the groove being displaced outwardly relative to the rubber spaced from said groove, said grove having a depth in the range of approximately 20% to 50% of the ribs intended to be formed in the power transmission belt; and
   removing material from the compression layer at said grove to form the intended multirib power transmission belt.

2. The method of manufacturing a multirib power transmission belt comprising the steps of:
   forming a belt preform defining an unvulcanized rubber compression layer having transversely extending staple fibers distributed therein;
   causing the compression layer to be vulcanized while urging the compression layer against a mold having a suitable projection to form an inwardly widening shallow groove in the confronting surface of the compression layer, the rubber of the compression layer adjacent the groove being displaced outwardly relative to the rubber spaced from said groove, said projection having a height preselected to cause the transversely extending staple fibers in the compression section portion adjacent the projection to be deflected outwardly from the transverse direction no more than approximately 30°; and
   removing material from the compression layer at said groove to form the intended multirib power transmission belt.

3. The method of manufacturing a multirib power transmission belt comprising the steps of:
   forming a belt preform defining an unvulcanized rubber compression layer having transversely extending staple fibers distributed therein;
   causing the compression layer to be vulcanized while urging the compression layer inwardly against a mold having a suitable raised projection to form an inwardly widening shallow groove in the confronting surface of the compression layer, the rubber of the compression layer adjacent the groove being displaced outwardly relative to the rubber spaced from said groove, said groove having a depth in the range of approximately 20% to 50% of the ribs intended to be formed in the power transmission belt, said projection having a height preselected to cause the transversely extending staple fibers in the compression section portion adjacent the projection to be deflected outwardly from the transverse direction no more than approximately 30°; and
   removing material from the compression layer at said groove to form the intended multirib power transmission belt.

4. The method of manufacturing a multirib power transmission belt of claims 1, 2 or 3 wherein said belt preform includes tensile cords overlying the compression layer, and an unvulcanized outer rubber layer overlying the tensile cords, said outer rubber layer being vulcanized concurrently with the vulcanizing of the compression rubber layer and forming a cushion layer embedding said tensile cords.

5. The method of manufacturing a multirib power transmission belt of claims 1, 2 or 3 wherein said shallow groove widens toward said mold and has a maximum width less than the maximum width of the groove between the ribs resulting from said step of removing material from the compression layer.

6. The method of manufacturing a multirib power transmission belt of claims 1, 2 or 3 wherein said step of removing material from the compression layer comprises a step of polishing.

7. The method of manufacturing a multirib power transmission belt of claims 1, 2 or 3 wherein said step of removing material from the compression layer comprises a step of cutting.

8. The method of manufacturing a multirib power transmission belt of claims 1, 2 or 3 wherein said compression layer is formed of a plurality of superposed sheets.

9. The method of manufacturing a multirib power transmission belt of claims 1, 2 or 3 wherein said compression layer is formed of a plurality of superimposed sheets each having a thickness of approximately 0.8 to 1.2 millimeters thickness.

* * * * *